United States Patent [19]

Falk et al.

[11] Patent Number: 4,627,722

[45] Date of Patent: Dec. 9, 1986

[54] METHOD AND APPARATUS FOR OPTICALLY MEASURING THREE-DIMENSIONAL COORDINATES

[75] Inventors: Robert A. Falk, Kent, Wash.; Gary L. Phillis, Boulder, Colo.

[73] Assignee: Ball Corporation, Muncie, Ind.

[21] Appl. No.: 646,638

[22] Filed: Aug. 31, 1984

[51] Int. Cl.$^4$ .............................................. G01B 9/02
[52] U.S. Cl. .................................... 356/4.5; 356/352; 356/363
[58] Field of Search ................ 356/352, 358, 363, 4.5, 356/1

[56] References Cited

U.S. PATENT DOCUMENTS

| | | | |
|---|---|---|---|
| 2,604,004 | 7/1952 | Root, III | 88/14 |
| 3,765,772 | 10/1973 | Willett | 356/352 |
| 3,970,389 | 7/1976 | Mendrin et al. | 356/106 |
| 4,146,924 | 3/1979 | Birk et al. | 364/513 |
| 4,457,625 | 7/1984 | Greenleaf et al. | 356/360 |

OTHER PUBLICATIONS

J. W. C. Gates, M. C. Hutley, and R. F. Stevens, Nelex 80, 7-9 Oct. 1980, National Engineering Laboratory, East Kilbride, U.K., 1980, paper 2.3.

M. C. Hutley, Nelex 82, 14-16 Sep. 1982, National Engineering Laboratory, East Kilbride, U.K., 1982, paper 6.1.

Primary Examiner—Davis L. Willis
Assistant Examiner—Matthew W. Koren
Attorney, Agent, or Firm—Sheridan, Ross & McIntosh

[57] ABSTRACT

The disclosed apparatus provides a point optical radiation source (i.e. point light source), at one or more distant points, the three-dimensional coordinates of which are to be measured relative to a known frame of reference. Each point light source emits light waves of a known wavelength which are received by the front plate of a multiple-beam interferometer means having a known angle of light acceptance. With respect to the light waves transmitted by each point light source and received by the interferometer means, a set of non-localized multiple-beam interference fringes are created within the interferometer means. A photo-electric detection means is provided a known distance from the back plate of the multiple-beam interferometer means and is positioned so that the interferometer means and photo-electric detection means have a common optical center axis. The intersection of such optical center axis and the plane defined by the back plate of the interferometer means establishes the origin of the known frame of reference. The photo-electric detection means both detects the two-dimensional position of at least the innermost fringe of each set of interference fringes, and transmits the detected positional information to a processor means by electric signals. The processor means employs the electric signals to determine the coordinate values for the center point of each set of interference fringes relative to the common optical center axis, and determines the radius of the innermost fringe of each set of interference fringes. Such determinations allow the processor means to calculate the three-dimensional coordinates of the distant points relative to the known frame of reference.

14 Claims, 2 Drawing Figures

METHOD AND APPARATUS FOR OPTICALLY MEASURING THREE-DIMENSIONAL COORDINATES

FIELD OF THE INVENTION

The present invention relates to an electro-optic measuring apparatus, and more particularly, to a non-contact method and apparatus for measuring three-dimensional coordinates through the utilization of optical radiation and multiple-beam interferometer means.

BACKGROUND OF THE INVENTION

It is known that optical radiation can be employed in non-contact systems which measure and/or verify the three-dimensional coordinates of specific points within a predetermined frame of reference. Such systems have a wide variety of beneficial applications, including use within the fields of metrology, robotics, quality control and machine/tool calibration. To date, two non-contact systems are known to have been employed for such purposes.

In a first system, a point light source is provided at a specific location, the three-dimensional coordinates of which are to be measured relative to a predetermined frame of reference. The optical radiation emitted from the point source is received by at least two light-sensitive array detectors (e.g. television cameras) that are positioned in such a manner that a triangle is defined by the point source and two detectors. Each detector senses the two-dimensional position of the point light source relative to the optical center axis of the detector, and such positional information is transmitted by electrical signals to a processor means. Knowledge of the precise orientation of each detector relative to the predetermined frame of reference, together with the information conveyed by the aforementioned electrical signals, allows the processor means to determine the three-dimensional coordinates of the point light source by triangulation methods. As may be appreciated, the above-described system requires substantial pre-calibration of both detectors relative to the predetermined frame of reference in order to ensure that the electrical signals transmitted by each detector can be accurately interrelated in carrying out the triangulation calculations. In addition, the two-detector system is substantially limited in actual practice to the measurement of the three-dimensional coordinates of one specific location at a time.

In a second known system, a coherent beam of light of a known wavelength is initially separated into first and second portions in a Michelson interferometer. The first portion of the separated beam is reflected internally within the interferometer, and the second portion of the beam is directed outward towards a cooperative surface, (e.g. mirror, Fresnel zone plate, etc.), which is centered about a specific point location, the three-dimensional coordinates of which are to be measured or verified relative to the Michelson interferometer. Upon reflection off of the cooperative surface, the second portion of the light beam is reunited with the first portion of the light beam on a common optical path within the Michelson interferometer to create circular interference fringes. By employing known fringe detection and counting techniques, one of the three-dimensional coordinates of the specific point location can be determined relative to the Michelson interferometer. Due to alignment requirements arising out of the manner of usage of the Michelson interferometer, the aforementioned circular interference fringes will not be created unless the aforementioned specific point lies on the known optical center axis of the Michelson interferometer. As such, it should be apparent that this system, in effect, is only capable of optically measuring one coordinate and optically verifying the other two coordinates for a specific point location. It should also be appreciated that the use of the above-described measuring system is limited to situations where a coherent light source and cooperative surface are present. Furthermore, the use of a Michelson interferometer in this system necessitates laborious two-dimensional pre-alignment procedures to ensure that interference fringes will be created.

DISCLOSURE OF THE INVENTION

It is therefore one object of the present invention to provide a non-contact, three-dimensional coordinate measuring apparatus which requires substantially no pre-calibration or pre-alignment procedures prior to operation, and which operates with a minimal number of components.

It is another object of the invention to provide a non-contact measuring apparatus which only employs a single photo-electric detection means, and which entails minimal overall system complexity.

It is still another object of the invention to provide a non-contact measuring apparatus which does not require a cooperative surface at each point for which three-dimensional coordinates are to be determined.

It is yet another object of the invention to provide a non-contact measuring apparatus which can employ either coherent or incoherent light.

It is another object of the invention to provide a non-contact measuring apparatus which can simultaneously determine the three-dimensional coordinates of a plurality of distant points.

Additional objects, advantages and novel features are set forth in the description which follows, and will become apparent to those skilled in the art upon examination hereof, or upon actual practice of the disclosed invention.

In accordance with the present invention an improved non-contact method and apparatus is provided for measuring the three-dimensional coordinates of distant points within a known frame of reference. The apparatus essentially comprises four basic components which, by either optical or electrical means, are in selective operative association.

The apparatus includes a means for providing a point optical radiation source (i.e. point light source), at one or more distant points, the three-dimensional coordinates of which are to be measured. The light which propagates from each point light source must include light waves of a predetermined wavelength $\lambda$, but such light waves may be either coherent or incoherent.

A multiple-beam interferometer means (e.g. Fabry-Perot interferometer) is positioned so that a portion of the light waves of wavelength $\lambda$ propagating from each point light source will encounter a front plate of the interferometer means. A portion of the incident light waves associated with each point light source pass through the front plate and encounter a back plate of the multiple-beam interferometer means. The interferometer means is designed in a known manner so that, with respect to each point light source, a portion of the associated light waves which pass through the front plate, and which have a common wavelength λ, will constructively interfere within the interferometer means on one of several optical paths which pass through the back plate at a predetermined angle of incidence. The constructive interference on such optical paths results in the creation of a set of concentric, circular non-localized multiple-beam interference fringes with respect to each point light source, (known as Tolansky fringes), which are visible on the back plate of the interferometer means. For the innermost interference fringe of each set of fringes, the known angle of incidence $\theta$ of the corresponding optical path is equal to the angle of incidence at which light rays traveling from the associated point light source must encounter the front plate of the interferometer means in order to pass substantially directly through the interferometer means. Such light rays exit the back plate of the interferometer means on a locus which corresponds with substantially the brightest circular portion, or middle, of the corresponding innermost interference fringe. In view of the foregoing, it should be appreciated that the present invention employs the multiple-beam interferometer means as an angular light filter wherein the angle of acceptance is $\theta$.

At this point, it should also be noted that the light provided by each point light source of the present invention may be chromatic or monochromatic. If chromatic light sources are provided however, an appropriate narrow bandpass wavelength filter will need to be interposed between the point light sources and interferometer means in order to ensure that the only light waves which encounter the interferometer means are light waves of the known wavelength λ.

A photo-electric detection means is provided a known distance d behind the back plate of the multiple-beam interferometer means, and is positioned in such a manner that the two components have a common optical center axis. The intersection of that center axis and the plane defined by the perpendicular back plate of the interferometer means establishes the origin of the three-dimensional frame of reference with respect to which the three-dimensional coordinates of the distant points are measured in accordance with the present invention.

The photo-electric detection means is designed to detect the two-dimensional position of the aforementioned circular interference fringes relative to the aforementioned common optical center axis, and transmits the positional information to a processor means by electric signals. The processor means in turn is employed to curve fit the equation of a circle to the transmitted two-dimensional information that corresponds with at least the innermost circular interference fringe of each set of fringes detected by the photo-electric detection means. Consequently, the processor is able to determine the two-dimensional coordinate values for the center of each set of circular fringes relative to the aforementioned optical center axis, and, since values for the aforementioned parameters d and $\theta$ are known, the processor is able to determine a radius r of each innermost circular fringe of each set of fringes, as such fringes appear on the back plate of the interferometer means. The two-dimensional coordinate values for the center of each set of circular fringes are equal to two of the three three-dimensional coordinates for the corresponding distant points. With respect to each innermost circular fringe, the processor means then employs the associated value for r and the known value for $\theta$ to trigonometrically determine the third three-dimensional coordinate of the corresponding distant point relative to the aforementioned frame of reference.

In order to increase the three-dimensional range of usage of the disclosed invention, while minimizing the size of the multiple-beam interferometer means and photo-electric detection means, an appropriate lens system may be interposed between the point light sources and the interferometer means. The addition of a lens system will vary the design of the interferometer means, and in particular, will typically necessitate a variation of the angle of acceptance $\theta$ for the interferometer means. In addition, a lens system will effect, in a known manner, the calculations necessary to determine the three-dimensional coordinates of distant points.

DETAILED DESCRIPTION OF THE PREFERRED EMBODIMENT

Figure 1:
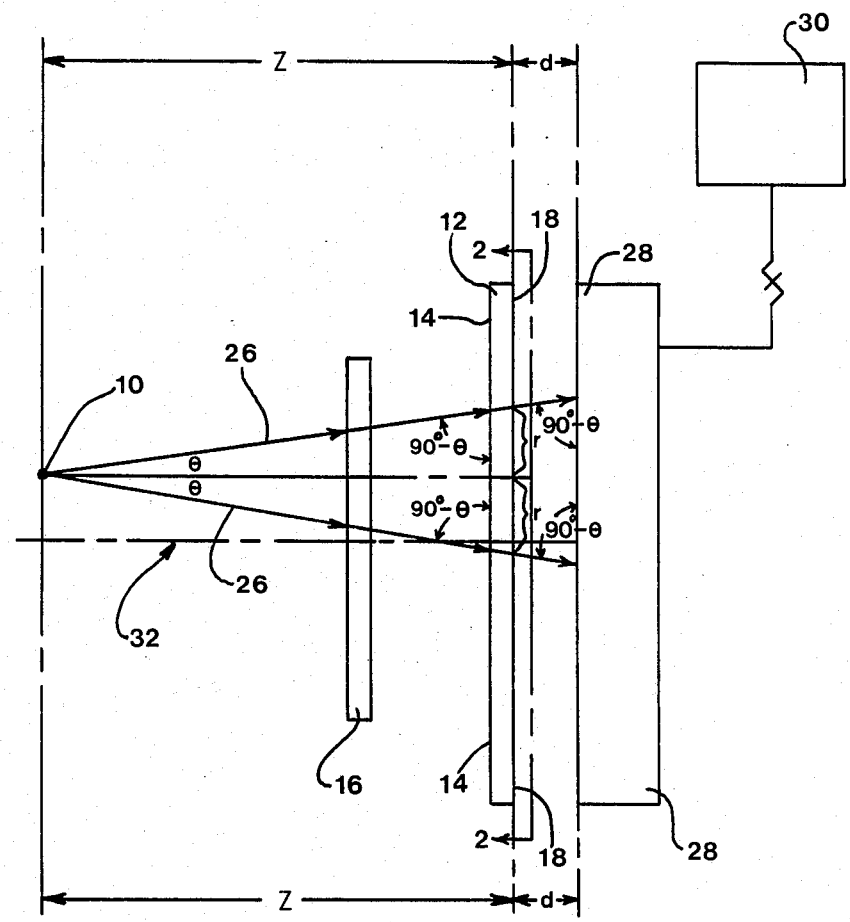
FIG. 1 is a block diagram showing the components of the preferred embodiment of the present invention.

In accordance with the preferred embodiment of the invention, FIG. 1 shows a block diagram of the apparatus. A point optical radiation source 10 (i.e. a point light source), is provided at a distant point location, the three-dimensional coordinates of which are to be measured relative to a known frame of reference, (as subsequently identified). By way of example, the point light source 10 may be in the form of a retroflector, a light emitting diode (LED) or a laser beam spot. The light which propagates from the point light source 10 must include light waves of a predetermined wavelength λ, but the light waves may be either coherent or incoherent.

A multiple-beam interferometer means 12, (e.g. a conventional Fabry-Perot interferometer), is positioned so that a portion of the light waves of wavelength λ propagating from the point light source 10 will encounter a front plate 14 of the Fabry-Perot interferometer 12. It should be pointed out that if the light provided by the point light source 10 is chromatic, an appropriate narrow bandpass wavelength filter 16 must be interposed between the point light source 10 and Fabry-Perot interferometer 12 to ensure that the only light waves which encounter the front plate 14 of the Fabry-Perot interferometer 12 are light waves of the known wavelength λ.

Figure 2:
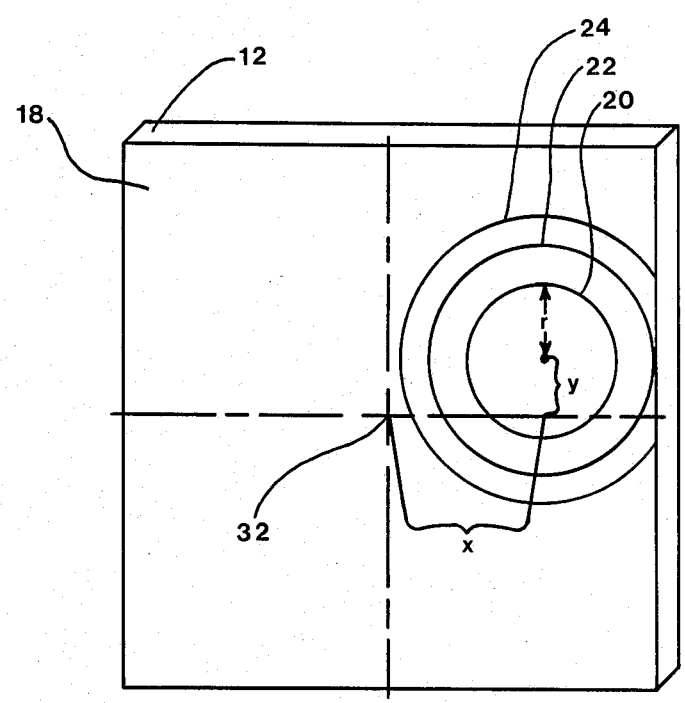
FIG. 2 is a side elevation view along sectional line 2—2 of FIG. 1.

A portion of the light waves incident upon the front plate 14 pass therethrough and encounter a back plate 18 of the Fabry-Perot interferometer 12. The Fabry-Perot interferometer 12 is designed so that a portion of the light waves of known wavelength λ which pass through the front plate 14 will constructively interfere in between the front plate 14 and back plate 18 on one of several optical paths which pass through the back plate 18 at a predetermined angle of incidence. As shown in FIG. 2, the constructive interference on such optical paths results in the creation of a series of concentric, circular non-localized multiple-beam interference fringes 20, 22 and 24, or rings, (known as Tolansky fringes), which are visible upon viewing the back plate 18 of the Fabry-Perot interferometer 12. It should be noted that the number of visible rings will depend upon the size of the Fabry-Perot interferometer 12. Due to the aforementioned design of the Fabry-Perot interferometer 12, the known angle of incidence $\theta$ for the optical paths associated with the creation of the innermost interference ring 20 is equal to the angle of incidence at which light rays traveling from the point light source 10 must encounter the front plate 14 of the Fabry-Perot interferometer 12 in order to pass substantially directly through the Fabry-Perot interferometer 12. The paths followed by such light rays from the point light source 10 to the front plate 14 shall be referred to herein as the direct acceptance paths 26. The light rays which follow one of the direct acceptance paths 26 exit the back plate 18 of the Fabry-Perot interferometer 12 on a locus which corresponds with substantially the brightest circular portion, or middle, of the innermost interference ring 20. In view of the foregoing, it should be appreciated that the Fabry-Perot interferometer 12 operates essentially as an angular filter having an acceptance angle of $\theta$.

As shown in FIG. 1, a photo-electric detection means 28 is provided a known distance d behind the back plate 18 of the Fabry-Perot interferometer 12, and is positioned in such a manner that the photo-electric detection means 28 and Fabry-Perot interferometer 12 have a common optical center axis 32. By way of example, the photo-electric detection means 28 may be a single charge coupled device (CCD) or a single Vidicon camera. The intersection of the aforementioned optical center axis 32 and the plane defined by the perpendicular back plate 18 of the Fabry-Perot interferometer 12 establishes the origin of the three-dimensional frame of reference with respect to which the three-dimensional coordinates of the distant point location is measured in accordance with the present invention.

The photo-electric detection means 28 is designed to detect the two-dimensional position of at least the innermost interference ring 20 relative to the optical center axis 32. Such positional information is transmitted by the photo-electric detection means 28 to a processor means 30 by electric signals. The processor means 30 is employed to curve fit the equation of a circle to the transmitted two-dimensional information which corresponds with at least the innermost circular interference ring 20. It should be noted that the photo-electric detection means 28 and processor means 30 may also be employed to curve fit the equation of a circle to the outer concentric interference rings 22 and 24, thereby allowing the processor means 30 to increase the accuracy of the circle equation determined with respect to the innermost ring 20.

Having determined the circle equation for the innermost ring 20, the processor means 30 then determines the two-dimensional coordinate values, x and y, for the center of the interference rings 20, 22 and 24, relative to the aforementioned optical center axis 32, see FIG. 2. As shown in FIGS. 1 and 2, such two-dimensional coordinate values x and y are equal to two of the three three-dimensional coordinates of the distant point, referred to herein as X and Y.

Next, the processor means 30 employs the circle equation for the innermost ring 20, and the known values for the aforementioned parameters d and $\theta$, to determine the radius r of the innermost ring 20 as such ring 20 appears on the back plate 18 of the Fabry-Perot interferometer 12, (see FIG. 2). The processor means 30 then utilizes the known values for r and $\theta$, and the aforementioned direct acceptance paths 26, to trigonometrically determine the third three-dimensional coordinate Z of the distant point according to the following equation, (see FIG. 1):

$$Z = r \tan \theta.$$

In this equation, Z is essentially equal to the shortest distance from the distant point to the plane defined by the back plate 18 of the Fabry-Perot interferometer 12.

In order to increase the three-dimensional range of usage of the above-described invention, while maintaining reasonable size parameters for the Fabry-Perot interferometer 12 (e.g. 10 mm.×10 mm.×2 mm) and photo-electric detection means 28 (e.g. 10 mm.×10 mm.), an appropriate lens system (e.g. a telescope lens system), may be interposed between the point light source 10 and Fabry-Perot interferometer 12. The addition of a lens system will effect, in a known manner, the optical paths followed by the light rays traveling from the point light source 10 to the front plate 14 of the Fabry-Perot interferometer 18. Knowledge of such varied optical paths, the focal length of the lens system, the distance between the lens system and Fabry-Perot interferometer 18, the designed angle of acceptance $\theta$, the determined values for the aforementioned inner ring 20 center coordinates x and y, and the determined value for the radius r of the inner ring 20, will allow one skilled in the art to trigonometrically calculate the three-dimensional coordinates X, Y and Z of a distant point location. Such calculations will vary in a known manner with the type of lens system employed.

In view of the foregoing, it should be pointed out that the present invention can be employed to optically measure one, two or all three of the three-dimensional coordinates of a distant point relative to a frame of reference that is dictated solely by the position of the interferometer means 12 and photo-electric detection means 28. It should also be apparent that the disclosed invention may be used to simultaneously determine the three-dimensional coordinates of a plurality of distant points. Such usage would necessitate the providing of a point light source means 10 at each distant point. In addition, the design of the multiple-beam interferometer means 12 and photo-electric detection means 28 would have to accommodate the creation and detection of several different and discernible sets of interference rings. Finally, it should also be noted that the present invention may be adapted to determine the distance of a distant point(s), and to monitor the three-dimensional coordinates of a non-stationary distant point(s) in such a manner that the velocity and direction of movement of the distant point(s) can be determined.

Based upon the above detailed description, salient features of the present invention can be easily recognized. The disclosed apparatus provides a point optical radiation source (i.e. point light source), at one or more distant points, the three-dimensional coordinates of which are to be measured relative to a known frame of reference. Each point light source emits light waves of a known wavelength which are received by the front plate of a multiple-beam interferometer means having a known angle of light acceptance. With respect to the light waves transmitted by each point light source and received by the interferometer means, a set of non-localized multiple-beam interference fringes are created within the interferometer means. A photo-electric detection means is provided a known distance from the back plate of the multiple-beam interferometer means and is positioned so that the interferometer means and photo-electric detection means have a common optical center axis. The intersection of such optical center axis and the plane defined by the back plate of the interferometer means establishes the origin of the known frame of reference. The photo-electric detection means both detects the two-dimensional position of at least the innermost fringe of each set of interference fringes, and transmits the detected positional information to a processor means by electric signals. The processor means employs the electric signals to determine the coordinate values for the center point of each set of interference fringes relative to the common optical center axis, and determines the radius of the innermost fringe of each set of interference fringes. Such determinations allow the processor means to calculate the three-dimensional coordinates of the distant points relative to the known frame of reference.

What is claimed is:

1. An apparatus for simultaneously measuring one to three of the three-dimensional coordinates of one or more distant points, comprising:

a means for providing a point optical radiation source at each said distant point;

a multiple-beam interferometer means which receives optical radiation emitted from each said point optical radiation source, and which creates at least one interference fringe with respect to each said point optical radiation source due to the optical radiation received therefrom;

a photo-electric detection means which detects at least a portion of said one interference fringe created with respect to each said point optical radiation source, and which transmits electric signals in response to each of the detected interference fringes; and processor means which receives said electric signals, and which employs the electric signals to determine one to three of the three-dimensional coordinates of each said distant point.

2. An apparatus, as recited in claim 1, wherein said multiple-beam interferometer means is a Fabry-Perot interferometer.

3. An apparatus, as recited in claim 1, wherein said optical radiation emitted from each said point optical radiation source is monochromatic.

4. An apparatus, as recited in claim 1, further comprising a narrow bandpass wavelength light filter interposed between each said point optical radiation source and said multiple-beam interferometer means.

5. An apparatus, as recited in claim 1, further comprising a lens system interposed between each said point optical radiation source and said multiple-beam interferometer means.

6. An apparatus, as recited in claim 1, wherein said processor means employs said determined three-dimensional coordinates to determine the distance of each said distant point.

7. An apparatus, as recited in claim 1, wherein each said interference fringe is a non-localized multiple-beam interference fringe.

8. An apparatus, as recited in claim 1, wherein said photo-electric detection means is a single charge coupled device.

9. An apparatus, as recited in claim 1, wherein said photo-electric detection means is a single Vidicon camera.

10. A method for simultaneously measuring one to three of the three-dimensional coordinates of one or more distant points, comprising the steps of:

providing a point optical radiation source at each said distant point;

employing a multiple-beam interferometer means to receive optical radiation emitted from each said point optical radiation source, and to create at least one non-localized mutliple-beam interference fringe with respect to each said point optical radiation source due to the optical radiation received therefrom;

detecting at least a portion of said one interference fringe created with respect to each said point optical radiation source;

transmitting electric signals in response to each said detected interference fringe; and employing said electric signals to determine one to three of the three-dimensional coordinates of each said distant point.

11. A method, as recited in claim 10, wherein said optical radiation emitted from each said point optical radiation source is monochromatic.

12. A method, as recited in claim 10, wherein said multiple-beam interferometer means is a Fabry-Perot interferometer.

13. A method, as recited in claim 12 further comprising the step of supplying a narrow bandpass wavelength filter between each said point optical radiation source and said Fabry-Perot interferometer.

14. A method as recited in claim 12 further comprising the step of interposing a lens system between each said point optical radiation source and said Fabry-Perot interferometer.

* * * * *